United States Patent
Oh et al.

(10) Patent No.: US 11,667,293 B2
(45) Date of Patent: Jun. 6, 2023

(54) DEVICE AND METHOD FOR CONTROLLING TRAVEL OF VEHICLE

(71) Applicants: Hyundai Motor Company, Seoul (KR); Kia Motors Corporation, Seoul (KR)

(72) Inventors: Dong Eon Oh, Seoul (KR); Hoi Won Kim, Seoul (KR); Doo Jin Um, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 166 days.

(21) Appl. No.: 17/026,916

(22) Filed: Sep. 21, 2020

(65) Prior Publication Data

US 2021/0380112 A1  Dec. 9, 2021

(30) Foreign Application Priority Data

Jun. 4, 2020  (KR) ........................ 10-2020-0067537

(51) Int. Cl.
*B60R 21/0134* (2006.01)
*B60W 30/08* (2012.01)
*B60W 30/095* (2012.01)
*B60W 30/18* (2012.01)
*B60W 40/02* (2006.01)
*B60W 40/06* (2012.01)
*B60W 50/14* (2020.01)
(Continued)

(52) U.S. Cl.
CPC ..... *B60W 30/18163* (2013.01); *G05D 1/0088* (2013.01); *B60W 2420/42* (2013.01); *B60W 2554/4041* (2020.02); *B60W 2554/801* (2020.02); *G05D 2201/0213* (2013.01)

(58) Field of Classification Search
CPC .......... B60R 21/0134; B60W 2420/42; B60W 2554/4041; B60W 2554/801; B60W 50/16; B60W 2050/146; B60W 2554/802; B60W 50/14; B60W 30/0956; B60W 2540/20; B60W 2552/50; B60W 2552/53; B60W 2554/804; B60W 40/06; B60W 30/18163; B60W 30/08; B60W 40/02; B60W 2050/143; B60W 2556/50; B60Y 2300/08; B60Y 2300/18166; G05D 1/0088; G05D 2201/0213
USPC .......................................................... 701/23
See application file for complete search history.

(56) References Cited

U.S. PATENT DOCUMENTS

2017/0043780 A1* 2/2017 Yoon ............... B60W 30/18163
2018/0178715 A1* 6/2018 Fujii ..................... B60W 10/18
(Continued)

FOREIGN PATENT DOCUMENTS

KR  101976682 B1  8/2019

*Primary Examiner* — Abby Y Lin
*Assistant Examiner* — Hossam M Abd El Latif
(74) *Attorney, Agent, or Firm* — Fox Rothschild LLP (57) ABSTRACT

A device for controlling travel of a vehicle is provided. The device includes an information acquiring device that acquires vehicle information and vehicle surroundings information and a controller that determines a location of a traveling lane based on the vehicle information and the vehicle surroundings information. The controller then determines a control state for a lane change based on the location of the traveling lane. Thus, the device allows the lane change to be performed safely while obeying the traffic rules.

20 Claims, 9 Drawing Sheets

(51) Int. Cl.
*B60W 50/16* (2020.01)
*G05D 1/00* (2006.01)

(56) References Cited

U.S. PATENT DOCUMENTS

2018/0357904 A1* 12/2018 Miyata ............ B60W 30/18163
2020/0168098 A1* 5/2020 Huang ................... G08G 1/167
2020/0324777 A1* 10/2020 Kato ........................ B62D 6/00

* cited by examiner

| | DETERMINATION RESULT | CLUSTER (MAIN) | CLUSTER (SIMPLIFIED) | REFERENCE |
|---|---|---|---|---|
| CONTROL STATE FOR LANE CHANGE | OFF (NO INDICATION) | | | - NO INDICATION |
| | Standby | | | - VISUAL |
| | Ready | | | - VISUAL |
| | Active | BLINK | BLINK | - VISUAL |
| | Cancel | BLINK | BLINK | - VISUAL + TACTILE OR VISUAL + AUDIBLE (SELECTABLE) |
| | Fail | | | - IMMEDIATELY AFTER OCCURRENCE: VISUAL + TACTILE OR VISUAL + AUDIBLE (SELECTABLE) AFTERWARD: VISUAL |

DEVICE AND METHOD FOR CONTROLLING TRAVEL OF VEHICLE

CROSS-REFERENCE TO RELATED APPLICATION

This application claims the benefit of priority to Korean Patent Application No. 10-2020-0067537, filed on Jun. 4, 2020, the entire contents of which are incorporated herein by reference.

TECHNICAL FIELD

The present disclosure relates to a device and a method for controlling travel of a vehicle, and more particularly, to a device and method for controlling travel of a vehicle that perform lane change based on a result of determining a traveling lane based on vehicle surroundings information.

BACKGROUND

A lane change assisting device automatically changes a lane using an input of a driver or information of a route set up to a destination. Based on the traffic laws, a line on a road is painted in a dotted line form with respect to a direction of allowing lane change. Thus, the lane change assisting device must determine whether the form of the line is the dotted line to change the lane in compliance with the traffic laws.

In general, the lane change assisting device recognizes the line using information acquired by a camera disposed at a front portion of a vehicle, but a recognition rate varies based on an external illuminance, a line painting condition, weather, and the like. Thus, performing the lane change based on a recognition result obtained using only the information acquired by the camera may lead to a dangerous situation.

SUMMARY

The present disclosure provides a device and a method for controlling travel of a vehicle that performs lane change based on a result of determining a traveling lane based on vehicle surroundings information. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling travel of a vehicle may include an information acquiring device configured to acquire vehicle information and vehicle surroundings information, and a controller configured to determine a location of a traveling lane based on the vehicle information and the vehicle surroundings information, and determine a control state for a lane change based on the location of the traveling lane. In one implementation, the information acquiring device may include a sensor configured to detect a surrounding object located at a distance from the vehicle greater than a predetermined distance, a navigation configured to acquire location information of the vehicle, and an imaging device configured to acquire information of a traveling road of the vehicle.

In one implementation, the controller may be configured to determine the control state for the lane change as an off state without detecting the surrounding object when the surrounding object is located within the predetermined distance from the vehicle. Additionally, the controller may be configured to determine that the vehicle has entered a control section and determine whether a driver has an intention to change a lane when the surrounding object is located at the distance from the vehicle greater than the predetermined distance. The controller may be configured to determine the control state for the lane change as a standby state in response to determining that the driver has the intention to change the lane.

Further, the controller may be configured to determine whether a lane change condition is satisfied when the control state for the lane change is determined as the standby state, and determine the control state for the lane change as a ready state when the lane change condition is satisfied. The controller may be configured to determine whether there is a risk of collision with a surrounding vehicle and determine whether the lane change condition is satisfied in response to determining the control state for the lane change as the ready state. In particular, the controller may be configured to determine the control state for the lane change as an active state in response to determining that the lane change condition is satisfied in the ready state and that there is no risk of the collision with the surrounding vehicle.

The controller may also be configured to determine whether a lane change cancellation condition is satisfied in the active state, and determine the control state for the lane change as a cancel state in response to determining that the lane change cancellation condition is satisfied. In one embodiment, the controller may be configured to output a determination in at least one of visual, tactile, and audible schemes when the control state for the lane change is determined.

According to another aspect of the present disclosure, a method for controlling travel of a vehicle may include acquiring vehicle information and vehicle surroundings information, and determining a location of a traveling lane based on the vehicle information and the vehicle surroundings information, and determining a control state for a lane change based on the location of the traveling lane. In one implementation, the acquiring of the vehicle information and the vehicle surroundings information may include detecting a surrounding object located at a distance from the vehicle greater than a predetermined distance, acquiring location information of the vehicle, and acquiring information of a traveling road of the vehicle.

In addition, the determining of the control state for the lane change may include determining the control state for the lane change as an off state without detecting the surrounding object in response to determining that the surrounding object is located within the predetermined distance from the vehicle. The method may further include determining that the vehicle has entered a control section and determining whether a driver has an intention to change a lane in response to determining that the surrounding object is located at the distance from the vehicle greater than the predetermined distance.

In one embodiment, the method may further include determining the control state for the lane change as a standby state in response to determining that the driver has the intention to change the lane. The method may further include determining whether a lane change condition is satisfied in response to determining the control state for the lane change as the standby state, and determining the control state for the lane change as a ready state in response to determining that the lane change condition is satisfied.

The method may further include determining whether there is a risk of collision with a surrounding vehicle and determining whether the lane change condition is satisfied in response to determining the control state for the lane change as the ready state. In one implementation, the method may further include determining the control state for the lane change as an active state in response to determining that the lane change condition is satisfied in the ready state and that there is no risk of the collision with the surrounding vehicle. In addition, the method may further include determining whether a lane change cancellation condition is satisfied in the active state, and determining the control state for the lane change as a cancel state in response to determining that the lane change cancellation condition is satisfied. The method may further include outputting a determination in at least one of visual, tactile, and audible schemes in response to determining the control state for the lane change.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the embodiment of the present disclosure.

In describing the components of the exemplary embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
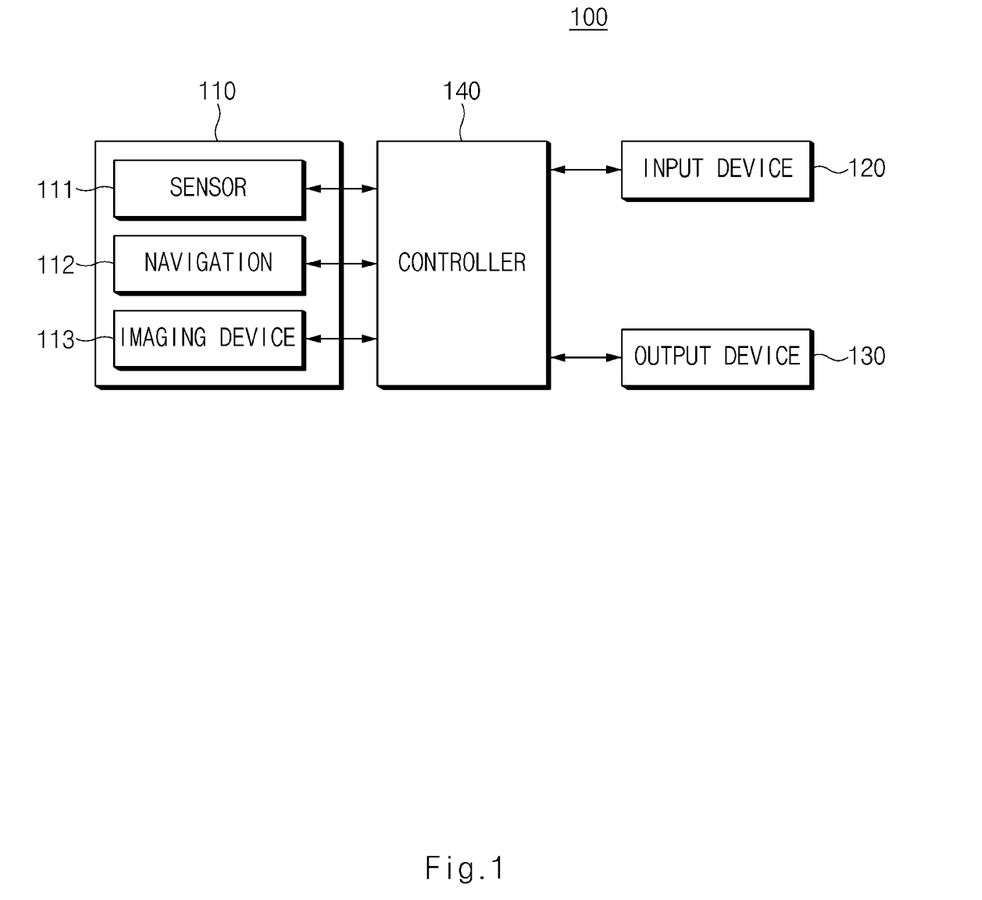
FIG. 1 is a configuration diagram illustrating a configuration of a vehicle travel controlling device according to an exemplary embodiment of the present disclosure.

FIG. 1 is a configuration diagram illustrating a configuration of a vehicle travel controlling device according to an exemplary embodiment of the present disclosure. As shown in FIG. 1, a vehicle travel controlling device 100 according to an exemplary embodiment of the present disclosure may include an information acquiring device 110, an input device 120, an output device 130, and a controller 140. The information acquiring device 110 may include a sensor 111, a navigation 112, and an imaging device 113. Each of the components may be operated by the controller 140.

In particular, the information acquiring device 110 may be configured to acquire vehicle information and vehicle surroundings information. Accordingly, the information acquiring device 110 may include the sensor 111, the navigation 112, and the imaging device 113. The sensor 111 may be configured to detect a vehicle surrounding object located at a distance from the vehicle that is greater than a predetermined distance. In this connection, the predetermined distance may be about 55 m. According to an exemplary embodiment, the sensor 111 may be configured to acquire the distance of the vehicle surrounding object from the vehicle, and a relative speed and a relative acceleration of the vehicle surrounding object. In addition, the sensor 111 may be configured to sense a shape of a line painted on a surface of a road. Accordingly, the sensor 111 may be implemented as an ultrasonic sensor, a LIDAR sensor, a radar sensor, a speed sensor, and an acceleration sensor.

In addition, the sensor 111 may be configured to sense an input signal based on an input (e.g., a manipulation) of a driver. According to an exemplary embodiment, the sensor 111 may be configured to sense a change in a steering wheel based on the input of the driver, and the sensor 111 may be implemented as a steering angle sensor configured to sense a rotational torque of the steering wheel for sensing the change in the steering wheel. In addition, the sensor 111 may be configured to sense an on/off state of the vehicle travel controlling device. According to an exemplary embodiment, when the sensor 111 senses that the vehicle travel controlling device is switched from an off state to an on state or is maintained in the on state, the controller 140 may be configured to determine that the vehicle is started.

The navigation 112 may include a global positioning system (GPS) receiver, and thus, the navigation 112 may be configured to receive a current location of the vehicle, provide map image information of a certain region based on the current location of the vehicle, provide information of a road where the vehicle travels, or provide a route from the current location to a destination where the driver wants to reach. Accordingly, the navigation 112 may include a separate output device to provide various information. According to an exemplary embodiment, the output device may include a display device and a sound output device. In addition, the output device of the navigation 112 may be integrally implemented with the output device 130 of the vehicle travel controlling device according to an exemplary embodiment of the present disclosure.

The input device 120 may be configured to generate an input signal corresponding to the manipulation, an operation, or a voice of the driver, and the input signal may be transmitted to the controller 140. According to an exemplary embodiment, the input device 120 may be implemented as a scroll wheel, a button, a knob, a touch screen, a touch pad, a lever, a track ball, and the like that may be manipulated by the driver, or may implemented as at least one of a motion sensor and a voice recognition sensor that senses an operation or a voice of a passenger or as a combination thereof. The controller 140 may be configured to determine whether the driver has an intention to change the lane based on the input signal received from the input device 120. Accordingly, the input device 120 may be implemented with a user setting menu that may activate a lane change assisting function.

The output device 130 may be configured to output the determination through an output scheme corresponding to the determination of the controller 140. According to an exemplary embodiment, the output device 130 may be configured to output the determination in at least one of visual, audible, and tactile schemes. For example, the output device 130 may be configured to visually output the determination through a display device. In this connection, the display device may be implemented as a cluster, a head-up display (HUD), a navigation display device, and the like. In addition, the output device 130 may be disposed on the steering wheel or a seat and generate vibration to tactilely output the determination. In addition, the output device 130 may be configured to audibly output a beep sound or a guide message through a sound output device.

The controller 140 may be implemented by various processing devices such as a microprocessor having a semiconductor chip embedded therein capable of performing operation or execution of various instructions, and may be configured to execute an operation of the vehicle travel controlling device according to an exemplary embodiment of the present disclosure. Specifically, the controller 140 may be configured to determine a location of a traveling lane based on the vehicle information and the vehicle surroundings information, and determine a control state for lane change based on the location of the traveling lane.

More specifically, the controller 140 may be configured to determine whether the vehicle is started and whether the vehicle has entered a control section. In this connection, the control section may refer to a control section for the lane change. In response to determining that the surrounding object is located at a distance from the vehicle that is greater than the predetermined distance, the controller 140 may be configured to determine that the vehicle has entered the control section. In addition, when at least one lane is adjacent to the lane where the vehicle is traveling and has the same travel direction as that of the vehicle or when there is no intersection or crosswalk in front of the vehicle, the controller 140 may be configured to determine that the vehicle has entered the control section.

In response to determining that the vehicle has entered the control section, the controller 140 may be configured to determine whether the driver has the intention to change the lane. In one example, in response to determining that the surrounding object is located within the predetermined distance from the vehicle, the controller 140 may be configured to determine that the vehicle has not entered the control section and may be configured to determine that the control state for the lane change is an off state. In addition, when at least one of a case in which there is no lane adjacent to the lane where the vehicle is traveling and having the same travel direction as that of the vehicle and a case in which there is the intersection or the crosswalk in front of the vehicle, the controller 140 may be configured to determine that the vehicle has not entered the control section.

The controller 140 may be configured to determine whether the driver has the intention to change the lane based on the manipulation of the input device 120 of the driver and the information sensed by the sensor 111. For example, when a turn signal lamp is manipulated, the controller 140 may be configured to determine that the driver has the intention to change the lane. Further, when a steering torque of the steering wheel by the manipulation of the driver is sensed and determined to be maintained for a predetermined time or longer, the controller 140 may be configured to determine that the driver has the intention to change the lane. In addition, the controller 140 may also be configured to determine that the driver has the intention to change the lane when the input device 120 is manipulated through the user setting menu to activate a lane change function.

In response to determining that the driver has the intention to change the lane, the controller 140 may be configured to determine the control state for the lane change as a standby state. In one example, when the controller 140 determines that the driver is not intending to change the lane, the controller 140 may be configured to determine the control state for the lane change as the off state. The controller 140 may be configured to determine whether a lane change condition is satisfied in the standby state. In this connection, the lane change condition may include one of a case in which the line is present, a case in which the vehicle is traveling at a speed equal to or greater than a speed at which the lane change may be performed, a case in which the vehicle is not in a tollgate section, and a case in which the vehicle is traveling in a section in which the lane change may be performed. When the lane change condition is satisfied, the controller 140 may be configured to determine that the lane change may be performed. Accordingly, in response to determining that the lane change condition is satisfied, the controller 140 may be configured to determine the control state for the lane change as a ready state.

The controller 140 may be configured to determine whether there is a risk of collision with the surrounding object in the ready state, and once again determine whether the lane change condition is satisfied. In response to determining that the lane change condition is satisfied and that there is no collision risk based on the distance between the vehicle and the surrounding object, the relative speed, and the relative acceleration in the ready state, the controller 140 may be configured to determine the control state for the lane change as an active state. On the other hand, in response to determining that the lane change condition is not satisfied in the ready state or that there is a risk of collision with a surrounding vehicle, the controller 140 may be configured to switch the control state for the lane change to the standby state.

The controller 140 may be configured to determine whether a lane change cancellation condition is satisfied in response to determining that the control state for the lane change is the active state, may be configured to execute the lane change in response to determining that the lane change cancellation condition is not satisfied, and determine the control state for the lane change as the ready state when the lane change is completed. In addition, in response to determining that the lane change cancellation condition is satisfied in the active state, the controller 140 may be configured to determine the control state for the lane change as a cancel state. In this connection, the lane change cancellation condition may include a case of deactivating lateral control, a case in which there is no line information, the case in which the driver is not willing to change the lane, and a case in which there is the risk of the collision with the surrounding object during the lane change.

The controller 140 may be configured to re-determine whether the lane change condition is satisfied when the control state for the lane change is the cancel state, determine the control state for the lane change as the ready state when the lane change condition is satisfied, and determine the control state for the lane change as the standby state when the lane change condition is not satisfied. The above-described operation of the controller 140 will be described in detail with reference to an exemplary embodiment of FIGS. 2 to 6.

Figure 2:
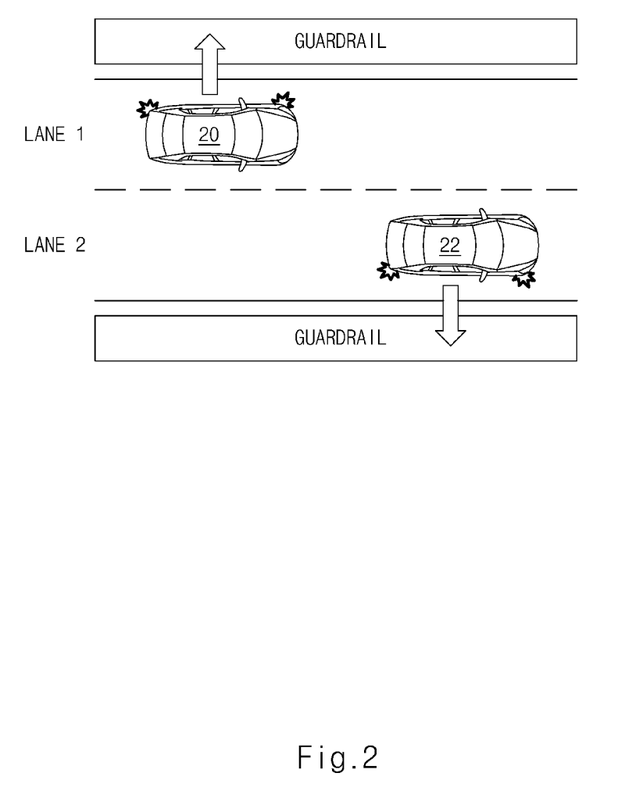
FIGS. 2 to 6 are views illustrating control states for lane change determined according to an exemplary embodiment of the present disclosure.

FIGS. 2 to 6 are views illustrating control states for lane change determined according to an exemplary embodiment of the present disclosure. As shown in FIG. 2, based on the information acquired by the information acquiring device 110, the controller 140 may be configured to determine that a traveling lane of a vehicle 20 is a lane 1, determine that a driver has an intention to change the lane as the driver manipulates a left turn signal lamp, and determine that a guardrail is located on a left side of a travel direction of the vehicle 20. In particular, the controller 140 may be configured to determine that a target lane of the lane change does not exist. In response to determining that a surrounding object is located within a predetermined distance from the vehicle 20, the controller 140 may be configured to determine the control state for the lane change as the off state. In addition, in response to determining that the surrounding object is located at a distance from the vehicle 20 greater than the predetermined distance, the controller 140 may be configured to determine the control state for the lane change as the standby state.

In addition, based on the information acquired by the information acquiring device 110, the controller 140 may be configured to determine that a traveling lane of a vehicle 22 is a lane 2, determine that a driver has an intention to change the lane as the driver manipulates a right turn signal lamp, and determine that the guardrail is located on a right side of a travel direction of the vehicle 22. In particular, the controller 140 may be configured to determine that the target lane of the lane change does not exist. In response to determining that a surrounding object is located within a predetermined distance from the vehicle 22, the controller 140 may be configured to determine the control state for the lane change as the off state. In addition, in response to determining that the surrounding object is located at a distance from the vehicle 22 greater than the predetermined distance, the controller 140 may be configured to determine the control state for the lane change as the standby state.

Figure 3:
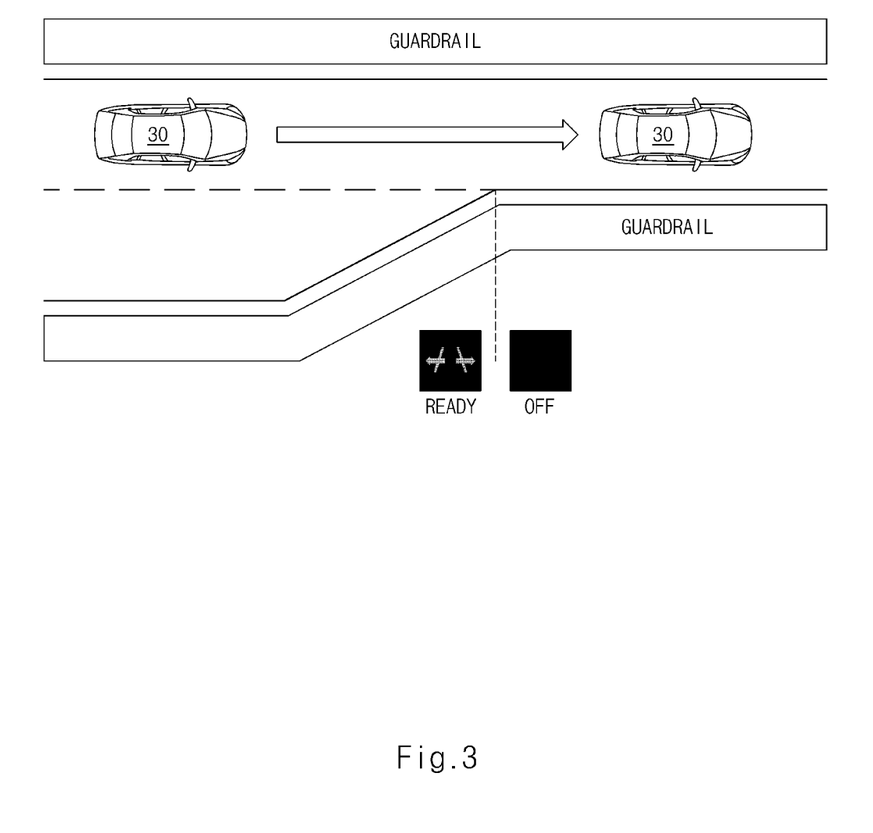

As shown in FIG. 3, the controller 140 may be configured to determine that the number of lanes adjacent to a traveling lane of a vehicle 30 is changed from 1 to 0 based on the information acquired by the information acquiring device 110. In response to determining that the number of lanes adjacent to the traveling lane of the vehicle and having the same travel direction as that of the vehicle becomes 0, the controller 140 may be configured to switch a control state (e.g., the ready state) for the lane change determined at a time point at which the number of lanes adjacent to the traveling lane of the vehicle is 1 to the off state at a time point at which the number of lanes adjacent to the traveling lane of the vehicle is 0.

Figure 4:
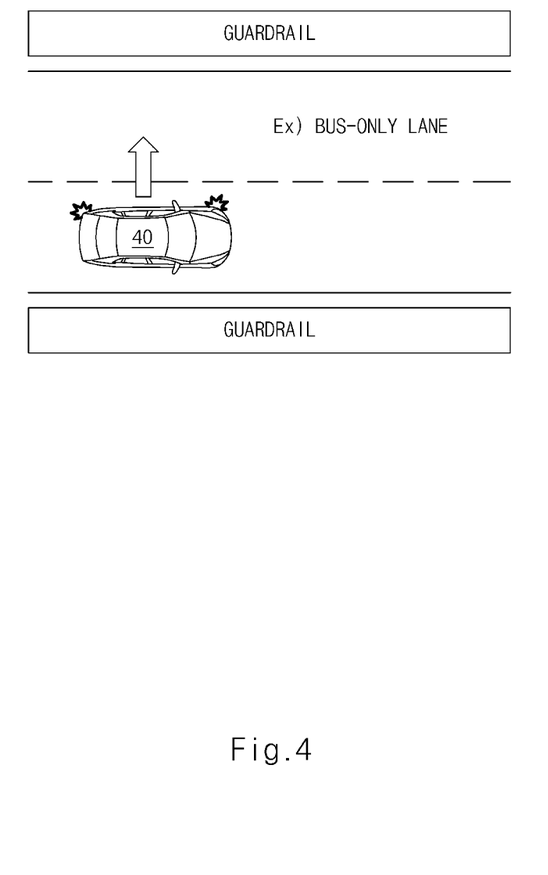

As shown in FIG. 4, in response to determining, based on the information acquired by the information acquiring device 110, that a lane adjacent to a traveling lane of a vehicle 40 at a left side is a travel lane dedicated to a specific vehicle (e.g., bus-only lane, a reversible lane), and that a driver has an intention to change the lane as the driver manipulates the left turn signal lamp, the controller 140 may be configured to determine that the control state for the lane change as the standby state.

Figure 5:
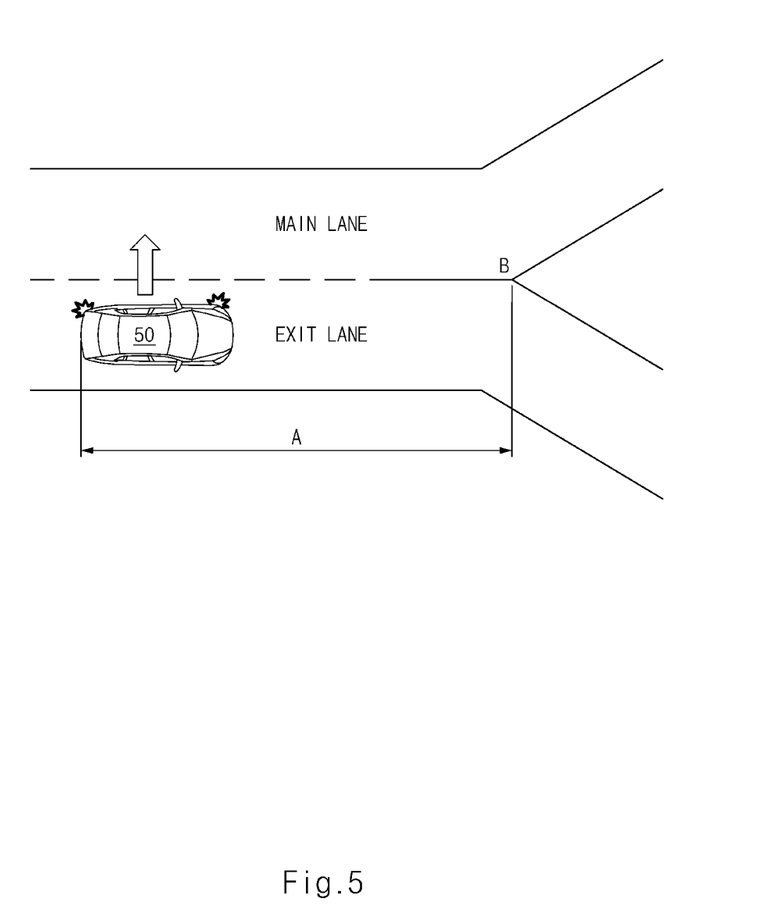

As shown in FIG. 5, based on the information acquired by the information acquiring device 110, the controller 140 may be configured to determine that a vehicle 50 is located on an exit lane, and that a longitudinal location of the vehicle is within a lane change required distance A from a branch point B. In response to determining that a driver has an intention to change the lane to a main lane as the driver manipulates a turn signal lamp in a direction of the main lane, the controller 140 may be configured to determine the control state for the lane change as the standby state.

Figure 6:
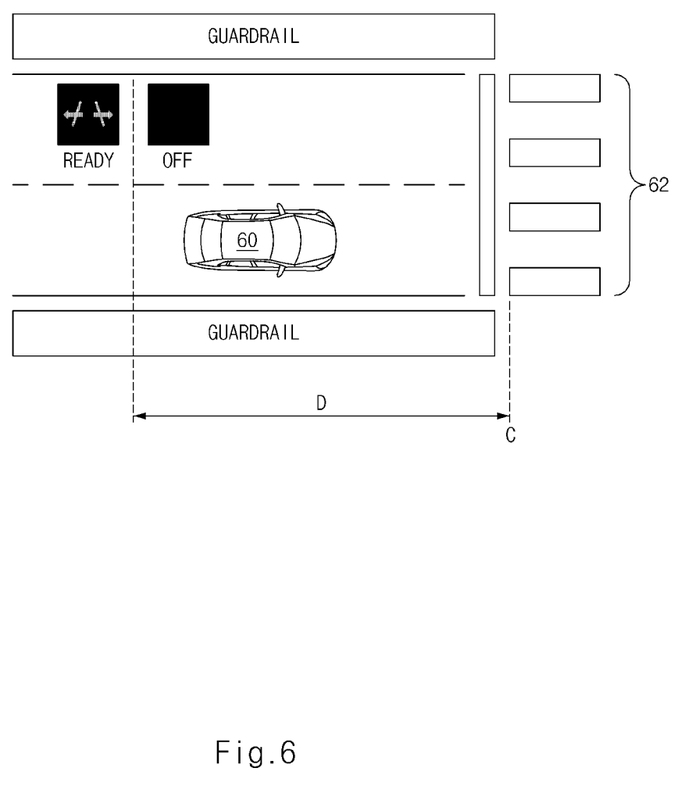

As shown in FIG. 6, the controller 140 may be configured to determine that a crosswalk 62 is located in front of a vehicle 60 based on the information acquired by the information acquiring device 110. In response to determining that the crosswalk 62 is located in front of the vehicle 60 and the vehicle 60 is located within a safe distance D from a start point C of the crosswalk 62, the controller 140 may be configured to switch a control state (e.g., the ready state) for the lane change determined of the vehicle 60 having a distance greater than the safe distance D to the off state at a time point at which the vehicle 60 is within the safe distance D.

The controller 140 may be configured to determine the location of the traveling lane based on the vehicle information and the vehicle surroundings information, and output the control state for the lane change determined based on the location of the traveling lane through the output device 130. According to an exemplary embodiment, the controller 140 may be configured to output the determination in at least one of the visual, the tactile, and the audible schemes. A more detailed operation of the controller 140 will be described with reference to FIG. 7.

Figure 7:
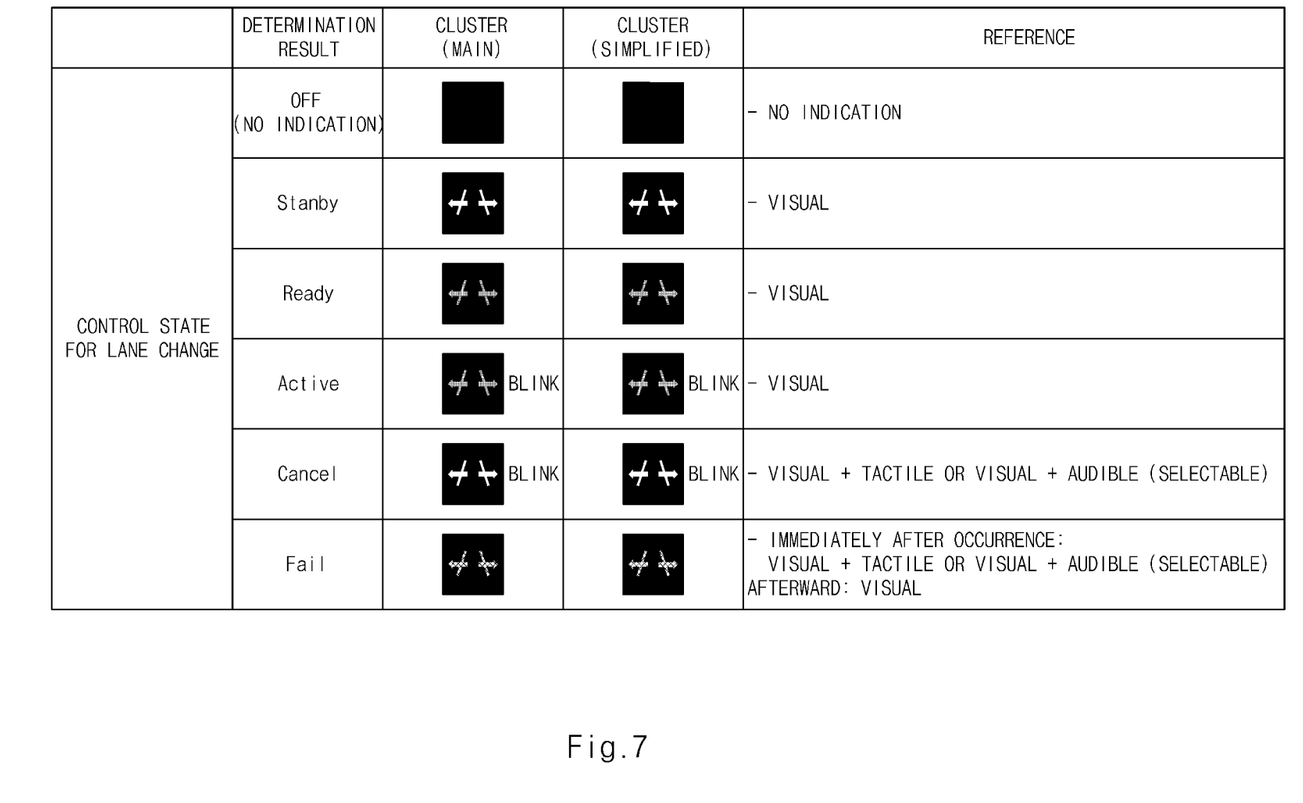
FIG. 7 is a view illustrating control states for lane change determined according to an exemplary embodiment of the present disclosure.

FIG. 7 is a view illustrating control states for lane change determined according to an exemplary embodiment of the present disclosure. As shown in FIG. 7, in response to determining that the control state for the lane change is the off state, the controller 140 may be configured to not output the determination in any of the visual, the tactile, and the audible schemes through the output device 130.

In response to determining that the control state for the lane change is the standby state, the controller 140 may be configured to output the determination in the visual scheme through the output device 130. For example, the controller 140 may be configured to generate and output a white lane change image. In response to determining that the control state for the lane change is the ready state, the controller 140 may be configured to output the determination in the visual scheme through the output device 130. For example, the controller 140 may be configured to generate and output a green lane change image.

In response to determining that the control state for the lane change is the active state, the controller 140 may be configured to output the determination in the visual scheme through the output device 130. For example, the controller 140 may be configured to generate the green lane change image and output the generated green lane change image in a blinking state. In response to determining that the control state for the lane change is the cancel state, the controller 140 may be configured to output the determination in a combination of the visual scheme and the tactile scheme or in a combination of the visual scheme and the audible scheme through the output device 130. The outputting scheme may be selected by a user. For example, the controller 140 may be configured to generate the white lane change image and output the generated white lane change image in the blinking state.

Figure 8:
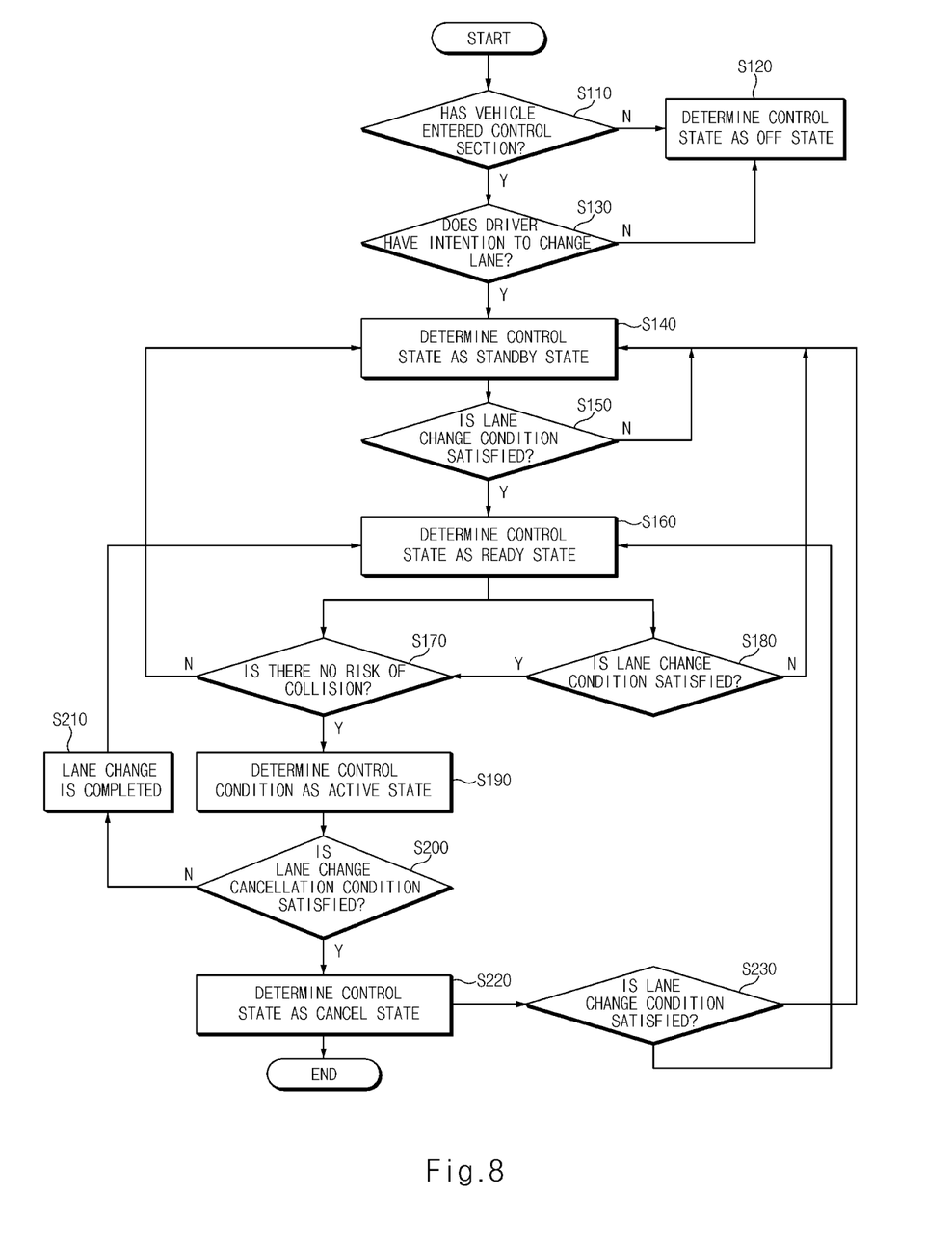
FIG. 8 is a flowchart illustrating a method for controlling travel of a vehicle according to an exemplary embodiment of the present disclosure.

FIG. 8 is a flowchart illustrating a method for controlling travel of a vehicle according to an exemplary embodiment of the present disclosure. As shown in FIG. 8, the controller 140 may be configured to determine whether the vehicle is started and whether the vehicle has entered the control section (S110). In S110, the control section may refer to the control section for the lane change. In S110, in response to determining that the surrounding object is located at the distance from the vehicle greater than the predetermined distance, the controller 140 may be configured to determine that the vehicle has entered the control section. In the case at least one of the case in which there is the at least one lane adjacent to the lane where the vehicle is traveling and having the same travel direction as that of the vehicle and the case in which there is no intersection or crosswalk in front of the vehicle, the controller 140 may be configured to determine that the vehicle has entered the control section. In response to determining in S110 that the vehicle has entered the control section (Y), the controller 140 may be configured to determine whether the driver has the intention to change the lane (S130).

In one example, in response to determining in S110 that the surrounding object is located within the predetermined distance from the vehicle, the controller 140 may be configured to determine that the vehicle has not entered the control section (N). In addition, in the case at least one of a case in which there is no lane adjacent to the lane where the vehicle is traveling and having the same travel direction as that of the vehicle and the case in which there is the intersection or the crosswalk in front of the vehicle, the controller 140 may be configured to determine that the vehicle has not entered the control section in S110. In response to determining that the vehicle has not entered the control section, the controller 140 may be configured to determine the control state for the lane change as the off state (S120).

The controller 140 may be configured to determine whether the driver has the intention to change the lane based on the manipulation of the input device 120 of the driver and the information sensed by the sensor 111 in S130. For example, in S130, the controller 140 may be configured to determine that the driver has the intention to change the lane when the turn signal lamp is manipulated, and determine that the driver has the intention to change the lane when the steering torque of the steering wheel by the manipulation of the driver is sensed and maintained for the predetermined time or longer. In addition, the controller 140 may also be configured to determine that the driver has the intention to change the lane when the input device 120 is manipulated through the user setting menu to activate the lane change function.

In response to determining in S130 that the driver has the intention to change the lane (Y), the controller 140 may be configured to determine the control state for the lane change as the standby state (S140). In one example, in response to determining in S130 that the driver has no intention to change the lane (N), the controller 140 may be configured to determine the control state for the lane change as the off state (S120). The controller 140 may be configured to determine whether the lane change condition is satisfied in the standby state (S150). In this connection, the lane change condition may include one of the case in which the line is present, the case in which the vehicle is traveling at the speed equal to or greater than the speed at which the lane change may be performed, the case in which the vehicle is not in the tollgate section, and the case in which the vehicle is traveling in the section in which the lane change may be performed. When the lane change condition is satisfied, the controller may be configured to determine that the lane change may be performed. Accordingly, in response to determining in S150 that the lane change condition is satisfied (Y), the controller 140 may be configured to determine the control state for the lane change as the ready state (S160).

When the vehicle is in the ready state, the controller 140 may be configured to determine whether there is a risk of the collision with the surrounding object (S170) and may be configured to re-determine whether the lane change condition is satisfied (S180). In response to determining in S170 and S180 that the lane change condition is satisfied (Y) and that there is no collision risk based on the distance between the vehicle and the surrounding object, the relative speed, and the relative acceleration in the ready state (Y), the controller 140 may be configured to determine the control state for the lane change as the active state (S190). On the other hand, in response to determining in S170 and S180 that the lane change condition is not satisfied in the ready state (N) or that there is the risk of the collision with the surrounding vehicle (N), the controller 140 may be configured to switch the control state for the lane change to the standby state (S140).

When the control state for the lane change is the active state, the controller 140 may be configured to determine whether the lane change cancellation condition is satisfied (S200). When the lane change cancellation condition is not satisfied (N) in S200, the controller 140 may be configured to execute the lane change. When the lane change in completed (S210), the controller 140 may be configured to determine the control state for the lane change as the ready state (S160). In addition, when the lane change cancellation condition is satisfied in the active state (Y) in S220, the controller 140 may be configured to determine the control state for the lane change as the cancel state (S220). In this connection, the lane change cancellation condition may include the case of deactivating the lateral control, the case in which there is no line information, the case in which the driver is not intending to change the lane, and the case in which there is the risk of the collision with the surrounding object during the lane change.

When the control state for the lane change is the cancel state, the controller 140 may be configured to re-determine whether the lane change condition is satisfied (S230). When the lane change condition is satisfied (Y) in S230, the controller 140 may be configured to determine the control state for the lane change as the ready state (S160), and when the lane change condition is not satisfied (N) in S230, the controller 140 may be configured to determine the control state for the lane change as the standby state (S140).

Figure 9:
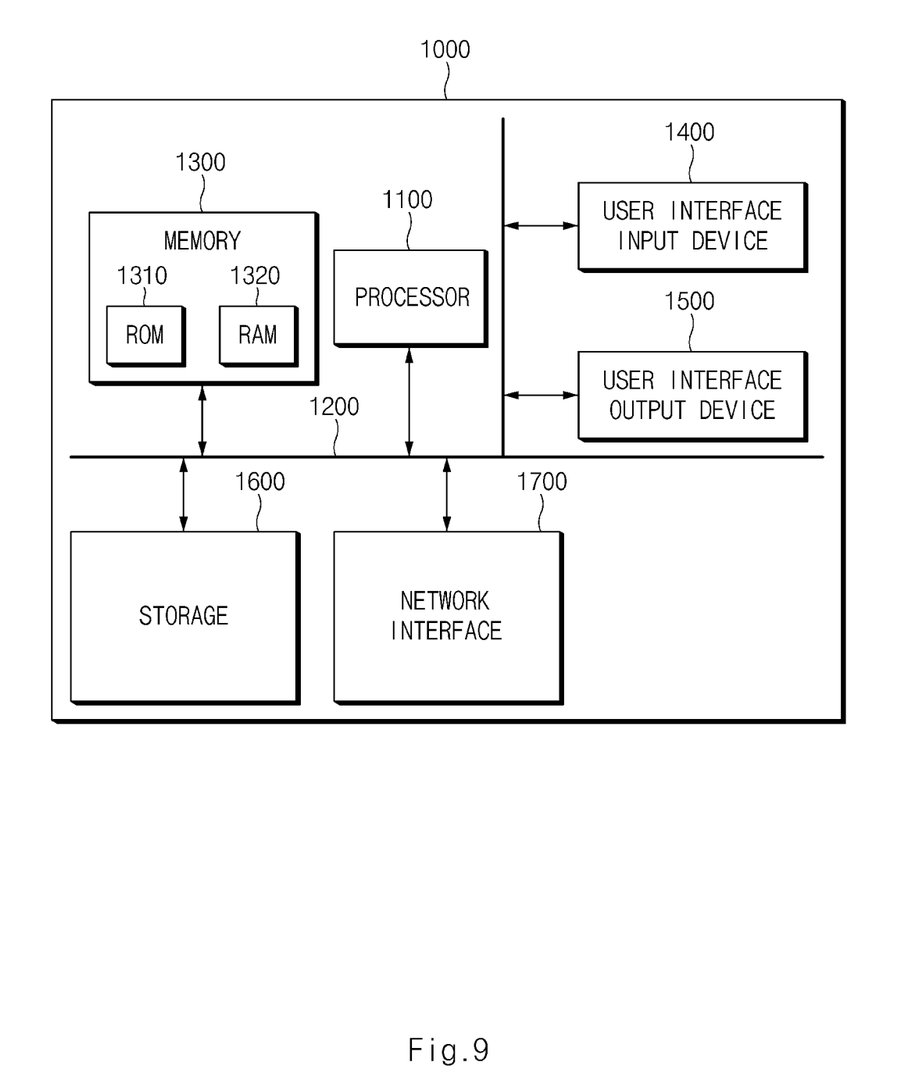
FIG. 9 illustrates a computing system in which a method according to an exemplary embodiment of the present disclosure is implemented.

FIG. 9 illustrates a computing system in which a method according to an exemplary embodiment of the present disclosure is implemented. With reference to FIG. 9, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the exemplary embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure. The device and the method for controlling the travel of the vehicle may determine the traveling lane based on the vehicle surroundings information to perform the lane change, thereby allowing the lane change to be performed safely while obeying the traffic rules.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling travel of a vehicle, comprising:
an information acquiring device configured to acquire vehicle information and vehicle surroundings information; and
a controller configured to determine a location of a traveling lane based on the vehicle information and the vehicle surroundings information, and determine a control state for a lane change based on the location of the traveling lane,
wherein the controller is configured to output the control state for the lane change through an output scheme corresponding to the control state for the lane change,
wherein the controller is configured to switch the control state for lane change based on distance from the vehicle to a start point of a crosswalk is located in front of the vehicle.

2. The device of claim 1, wherein the information acquiring device includes:
a sensor configured to detect a surrounding object located at a distance from the vehicle greater than a predetermined distance;
a navigation device configured to acquire location information of the vehicle; and
an imaging device configured to acquire information of a traveling road of the vehicle.

3. The device of claim 2, wherein the controller is configured to determine the control state for the lane change as a termination state when the vehicle has not entered a control section, and determine that the vehicle has not entered the control section when the surrounding object is located within the predetermined distance from the vehicle.

4. The device of claim 2, wherein the controller is configured to determine that the vehicle has entered a control section and determine whether a driver has an intention to change a lane when the surrounding object is located at the distance from the vehicle that is greater than the predetermined distance.

5. The device of claim 4, wherein the controller is configured to determine the control state for the lane change as a standby state in response to determining that the driver has the intention to change the lane.

6. The device of claim 5, wherein the controller is configured to:

determine whether a lane change condition is satisfied when the control state for the lane change is determined as the standby state; and determine the control state for the lane change as a ready state when the lane change condition is satisfied.

7. The device of claim 6, wherein the controller is configured to determine whether there is a risk of collision with a surrounding vehicle and determine whether the lane change condition is satisfied in response to determining the control state for the lane change as the ready state.

8. The device of claim 7, wherein the controller is configured to determine the control state for the lane change as an active state in response to determining that the lane change condition is satisfied in the ready state and that there is no risk of the collision with the surrounding vehicle.

9. The device of claim 8, wherein the controller is configured to:

determine whether a lane change cancellation condition is satisfied in the active state; and determine the control state for the lane change as a cancel state when the lane change cancellation condition is satisfied.

10. The device of claim 1, wherein the controller is configured to output a determination in at least one of visual, tactile, and audible schemes when the control state for the lane change is determined.

11. A method for controlling travel of a vehicle, comprising:

acquiring, by a controller, vehicle information and vehicle surroundings information; and determining, by the controller, a location of a traveling lane based on the vehicle information and the vehicle surroundings information, and determining a control state for a lane change based on the location of the traveling lane, outputting, by the controller, the control state for the lane change through an output scheme corresponding to the control state for the lane change, wherein the controller is configured to switch the control state for lane change based on distance from the vehicle to a start point of a crosswalk is located in front of the vehicle.

12. The method of claim 11, wherein the acquiring of the vehicle information and the vehicle surroundings information includes:

detecting, by the controller, a surrounding object located at a distance from the vehicle greater than a predetermined distance;

acquiring, by the controller, location information of the vehicle; and acquiring, by the controller, information of a traveling road of the vehicle.

13. The method of claim 12, wherein the determining of the control state for the lane change includes:

determining, by the controller, the control state for the lane change as a termination state when the vehicle has not entered a control section, and determine that the vehicle has not entered the control section when the surrounding object is located within the predetermined distance from the vehicle.

14. The method of claim 12, further comprising:

determining, by the controller, that the vehicle has entered a control section and determining whether a driver has an intention to change a lane when the surrounding object is located at the distance from the vehicle that is greater than the predetermined distance.

15. The method of claim 14, further comprising:

determining, by the controller, the control state for the lane change as a standby state in response to determining that the driver has the intention to change the lane.

16. The method of claim 15, further comprising:

determining, by the controller, whether a lane change condition is satisfied in response to determining the control state for the lane change as the standby state; and determining, by the controller, the control state for the lane change as a ready state when the lane change condition is satisfied.

17. The method of claim 16, further comprising:

determining, by the controller, whether there is a risk of collision with a surrounding vehicle and determining whether the lane change condition is satisfied in response to determining the control state for the lane change as the ready state.

18. The method of claim 17, further comprising:

determining, by the controller, the control state for the lane change as an active state in response to determining that the lane change condition is satisfied in the ready state and that there is no risk of the collision with the surrounding vehicle.

19. The method of claim 18, further comprising:

determining, by the controller, whether a lane change cancellation condition is satisfied in the active state; and determining, by the controller, the control state for the lane change as a cancel state when the lane change cancellation condition is satisfied.

20. The method of claim 11, further comprising:

outputting, by the controller, a determination in at least one of visual, tactile, and audible schemes in response to determining the control state for the lane change.

* * * * *